(12) United States Patent
Altmann

(10) Patent No.: US 8,157,069 B2
(45) Date of Patent: Apr. 17, 2012

(54) OVERRUNNING CLUTCH

(75) Inventor: Frieder Altmann, Pommersfelden (DE)

(73) Assignee: Schaeffler KG, Herzogenaurach (DE)

( * ) Notice: Subject to any disclaimer, the term of this patent is extended or adjusted under 35 U.S.C. 154(b) by 383 days.

(21) Appl. No.: 11/557,647

(22) Filed: Nov. 8, 2006

(65) Prior Publication Data

US 2007/0119676 A1 May 31, 2007

(30) Foreign Application Priority Data

Nov. 25, 2005 (DE) .......................... 10 2005 056 220

(51) Int. Cl.
*F16D 41/064* (2006.01)
(52) U.S. Cl. ........................................................ 192/45
(58) Field of Classification Search ...................... 192/45; 188/82.84
See application file for complete search history.

(56) References Cited

U.S. PATENT DOCUMENTS

| | | | |
|---|---|---|---|
| 3,031,053 A | 4/1962 | Sauzedde et al. | |
| 3,219,163 A | 11/1965 | Zlotek | |
| 3,404,760 A * | 10/1968 | Benson et al. | 192/45 |
| 3,500,977 A * | 3/1970 | Gehrke | 192/45 |
| 3,630,330 A * | 12/1971 | Pflugner | 192/45 |
| 3,760,914 A * | 9/1973 | Gelbrich | 192/45 |
| 3,917,036 A | 11/1975 | Johnson | |
| 3,937,312 A | 2/1976 | Gehrke | |

FOREIGN PATENT DOCUMENTS

| | | |
|---|---|---|
| DE | 1142254 | 1/1963 |
| DE | 6923286 | 11/1970 |
| DE | 8012661 | 8/1980 |
| DE | 8616605 | 7/1986 |
| DE | 19951389 | 5/2001 |

* cited by examiner

*Primary Examiner* — Richard M. Lorence
(74) *Attorney, Agent, or Firm* — Lucas & Mercanti, LLP

(57) ABSTRACT

In an overrunning clutch (1), an annular space is formed between an inner raceway (3) and an outer raceway, in which annular space is arranged a cage (5) which has cut-outs (4) for holding clamping bodies (2), with each cut-out (4) being delimited by transverse webs (10) which run in the axial direction, and with in each case one spring element (6), which projects into a cut-out (4) and exerts a force on a clamping body (2), adjoining the transverse webs (10). At that side of the transverse web (10) which faces away from the spring element (6), at least one retaining lug (4), which serves to retain a clamping body (2), extends into a cut-out (4).

8 Claims, 5 Drawing Sheets

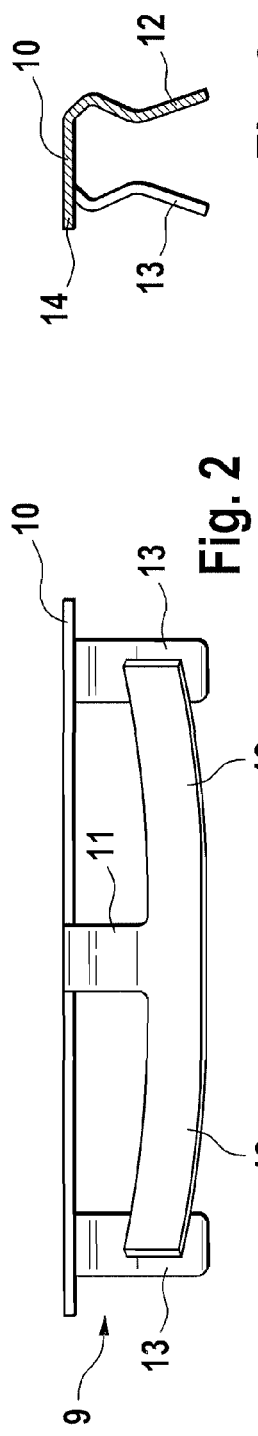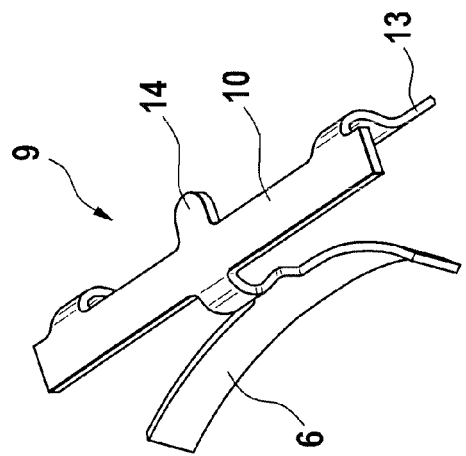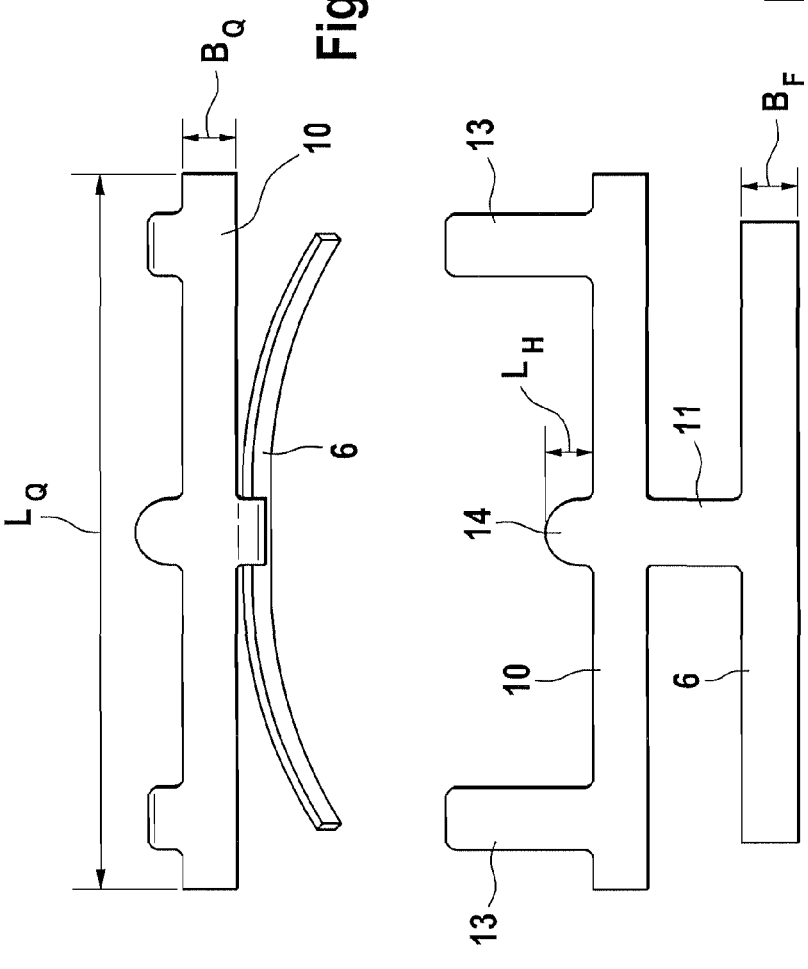

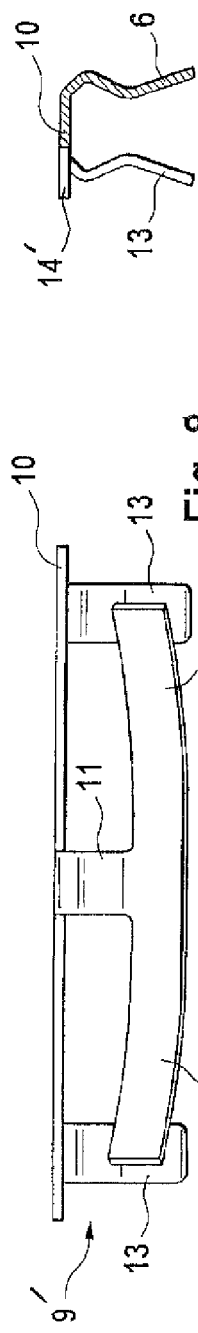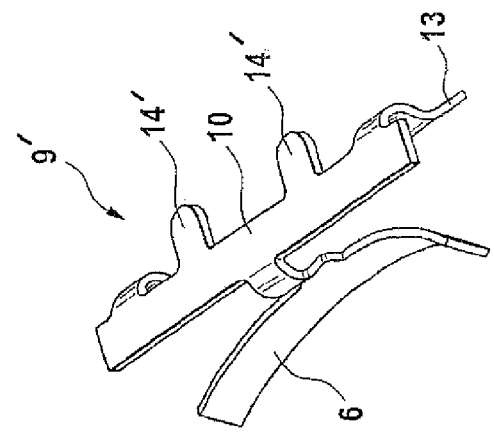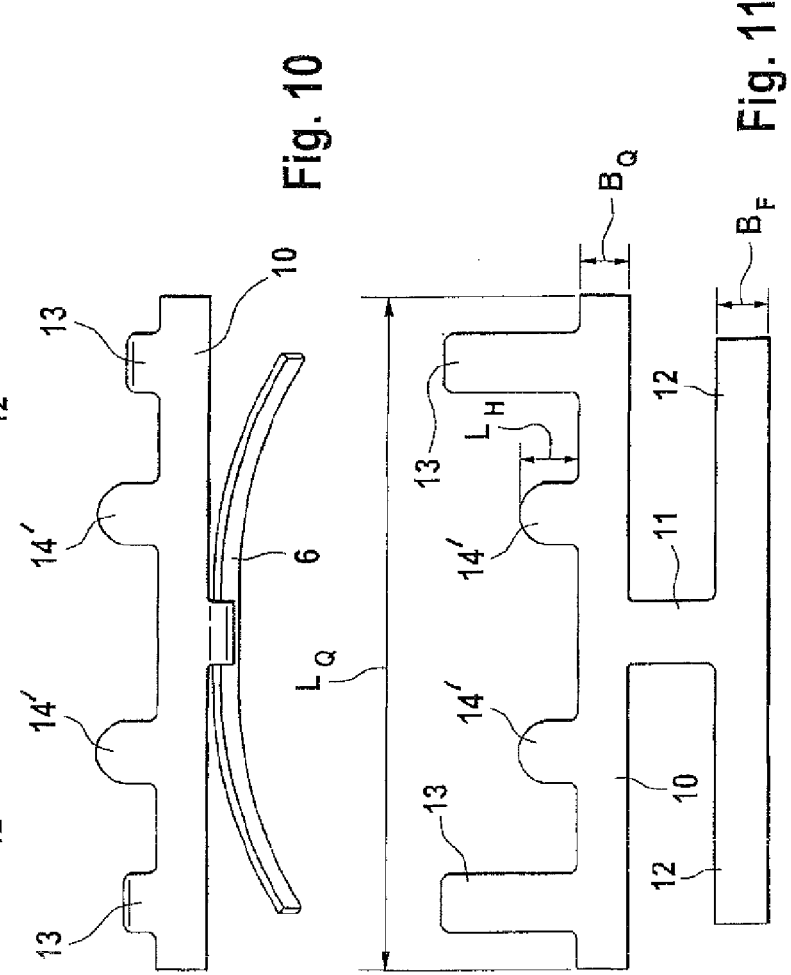

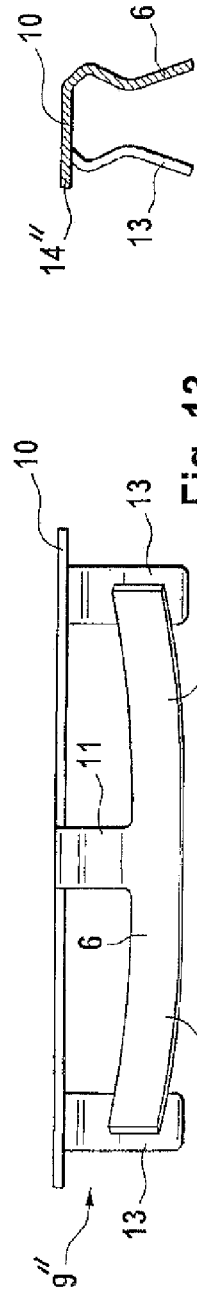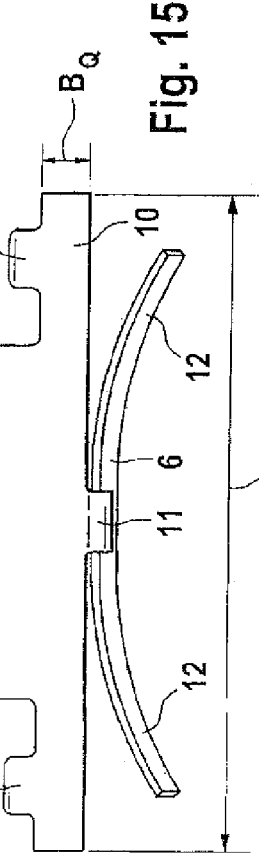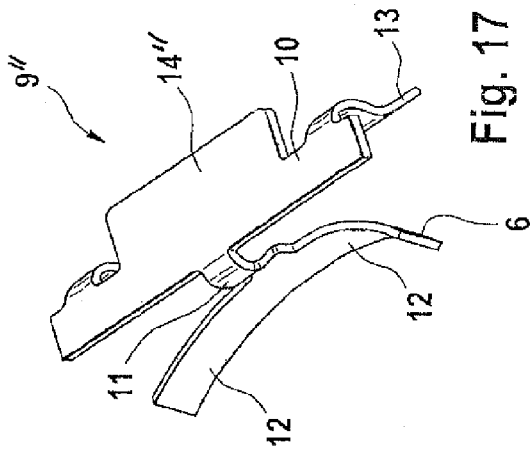

OVERRUNNING CLUTCH

FIELD OF THE INVENTION

The present invention relates to a frictionally engaging overrunning clutch having an annular space formed between an inner raceway and an outer raceway, in which annular space are arranged clamping bodies which are held in a cage.

BACKGROUND OF THE INVENTION

An overrunning clutch of the type mentioned in the introduction is, for example, known from DE 1 142 254 B. Two cages, which are provided for guiding the clamping bodies, are arranged in the annular space of said overrunning clutch, one of which cages is embodied as a ring made from resiliently elastic sheet metal. Said cage has cut-outs which are separated from one another by transverse webs which are arranged one behind the other in the peripheral direction and are arranged in the axial direction of the overrunning clutch. A resilient tongue extends from a transverse web into each cut-out, said tongue in each case exerting a force on a clamping body. The entire cage, which is manufactured from resilient sheet metal, is mounted radially within a second cage. The overall cage design of the known overrunning clutch is complex.

OBJECT OF THE INVENTION

The invention is based on the object of specifying a frictionally engaging overrunning clutch which, while providing unrestricted functionality, is distinguished in that it is particularly simple to assemble.

SUMMARY OF THE INVENTION

Said object is achieved according to the invention by means of an overrunning clutch having the features of claim 1. Said overrunning clutch has, in a manner known per se, an inner raceway and an outer raceway, between which is formed an annular space in which are guided individual clamping bodies which are arranged one behind the other in the peripheral direction in cut-outs of the cage. Individual transverse webs, which run in the axial direction, are situated between the cut-outs. Spring elements project from the transverse webs into the respectively adjacent cut-out in order to exert a force on the clamping bodies. The transverse webs can be part of the cage and/or of the spring elements. According to the invention, at that side of the transverse web which faces away from the spring element, at least one retaining lug, which serves to retain a clamping body, extends into the adjacent cut-out of the cage in the peripheral direction.

Here, the transverse web, the spring element and the at least one retaining lug are preferably manufactured in one piece, in particular from a resilient metal sheet. Said single-piece spring retaining element thus interacts, in one case resiliently and in the other case not resiliently or resiliently to only a negligible degree, with two clamping bodies which are arranged one behind the other in the peripheral direction. In a preferred embodiment, one separate spring retaining element of said type, which is attached to the cage as a so-called spring carrier, is situated in each case between two adjacent cut-outs of the cage. The overall number of spring carriers in the overrunning clutch therefore corresponds to the number of clamping bodies. Clamping rollers are preferably used as clamping bodies, said clamping rollers being distinguished in that they are particularly economical to produce, in particular in contrast to custom-made clamping bodies which are known in principle, for example, from DE 1 142 254 B. In addition, the clamping rollers are distinguished in that they have a particularly small spatial requirement in the radial direction. The cage which serves to guide the clamping bodies and to retain the spring carrier is preferably manufactured from plastic, in particular from fibre-reinforced plastic.

According to one preferred embodiment, the spring element is fastened to, that is to say integrally formed with, the transverse web in the central region of the latter and has two spring limbs which project out axially from said fastening region. The spring limbs are formed from a strip-shaped material portion which is angled so as to be approximately perpendicular, in particular at an angle of more than 60°, to the transverse web, and therefore runs approximately in a plane in which the rotational axis of the overrunning clutch lies. The spring element therefore has only a small spatial requirement within the annular space in the peripheral direction. This favours the close arrangement of clamping bodies in the annular space, and therefore the transmission of high torques, with a relatively compact design.

The width of the spring limb does not deviate from the width of the transverse web by any more than 50%, in particular by any more than 20%. With a narrow design of the transverse webs, the spring element therefore also has only a low spatial requirement within the annular space in the radial direction.

In the axial direction of the overrunning clutch, the spring limbs which are held on a transverse web preferably extend in total over at least 70% of the length of the transverse web, the transverse web being longer than the clamping bodies, in particular clamping rollers. The available axial installation space is therefore largely taken up by the spring elements.

The retaining lugs which adjoin the transverse webs have the particular advantage that they prevent the clamping bodies falling out of the cage during assembly, in particular when the cage without the outer raceway is placed on the inner raceway. The retaining lugs, however, should not only contribute to holding the clamping body in the cage, but should also simultaneously allow the clamping bodies to be inserted into the cage from the outside. In a preferred embodiment, allowance is made for these contradictory requirements in that the length, measured in the peripheral direction, of a retaining lug does not exceed 1.5 times the width, likewise measured in the peripheral direction, of a transverse web. This applies both to embodiments having one retaining lug and also to embodiments having two or more retaining lugs per transverse web. In any case, it is possible for the clamping bodies, in particular clamping rollers, to be automatically inserted into the cage of the overrunning clutch radially from the outside in a simple manner.

Two exemplary embodiments of the invention are explained in the following on the basis of a drawing, in which:

BRIEF DESCRIPTION OF THE DRAWINGS

FIGS. 2-6 show various views of a spring carrier of the overrunning clutch from FIG. 1;

FIGS. 8-12 show a spring carrier of the overrunning clutch from FIG. 7 in views similar to those of FIGS. 2-6;

FIGS. 13-17 show, in views similar to those of FIGS. 2-6, a third exemplary embodiment of a spring carrier of an overrunning clutch.

DETAILED DESCRIPTION OF THE DRAWINGS

Figure 1:
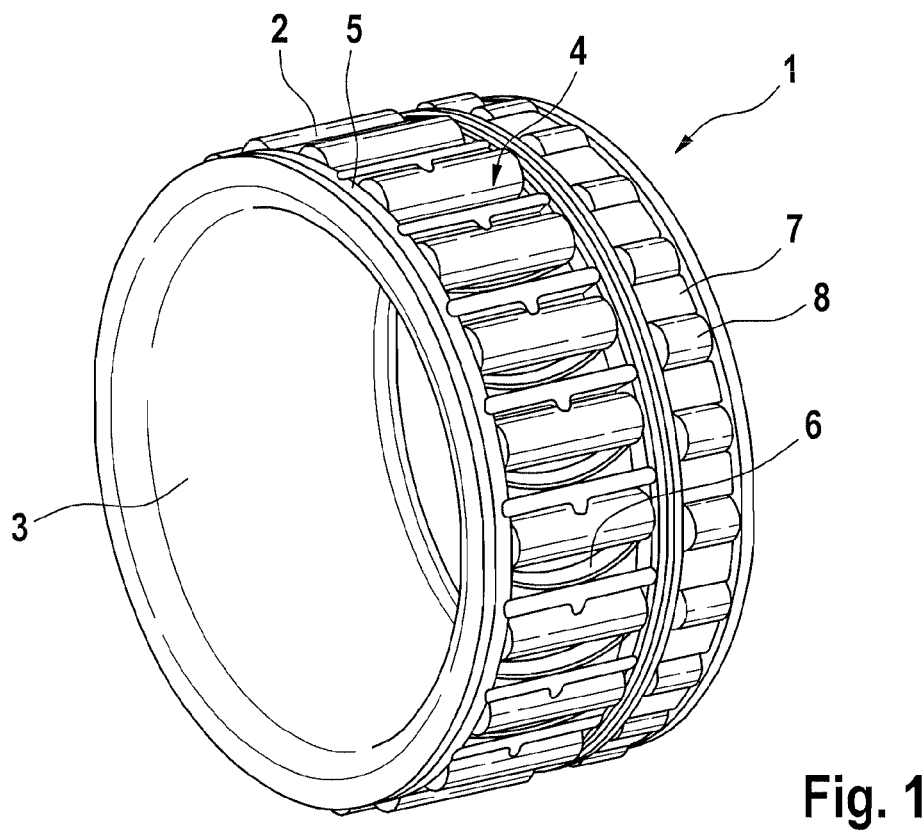
FIG. 1 is a perspective illustration of sections of a first exemplary embodiment of an overrunning clutch.
Figure 7:
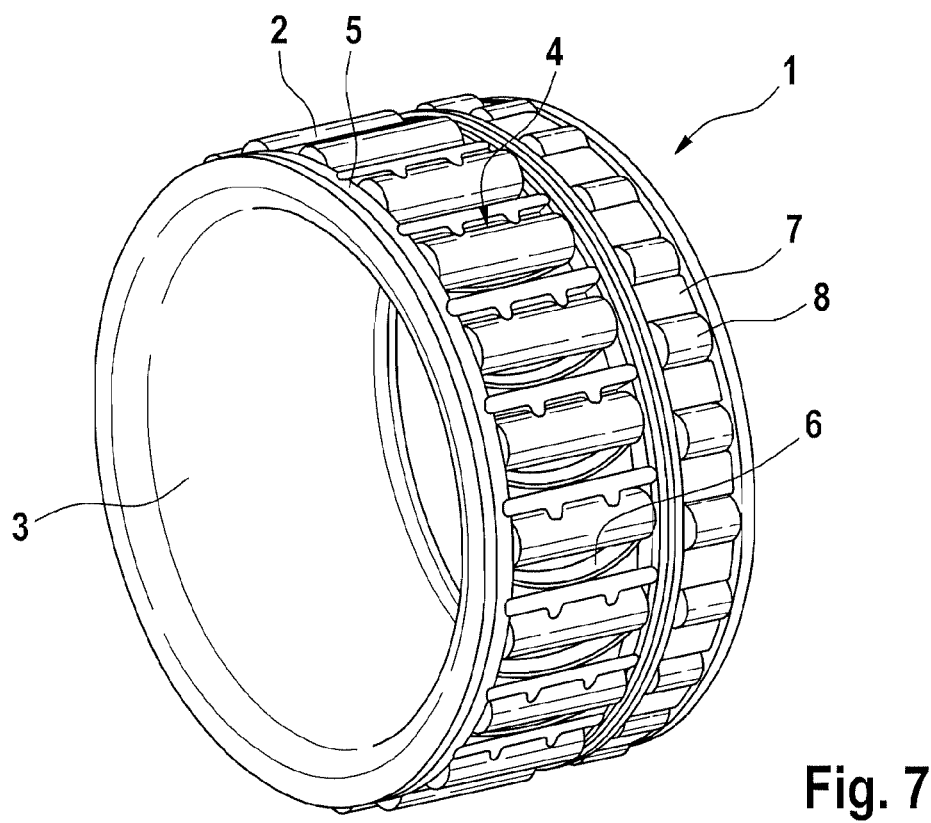
FIG. 7 shows a second exemplary embodiment of an overrunning clutch in a view similar to that of FIG. 1.
Figure 18:
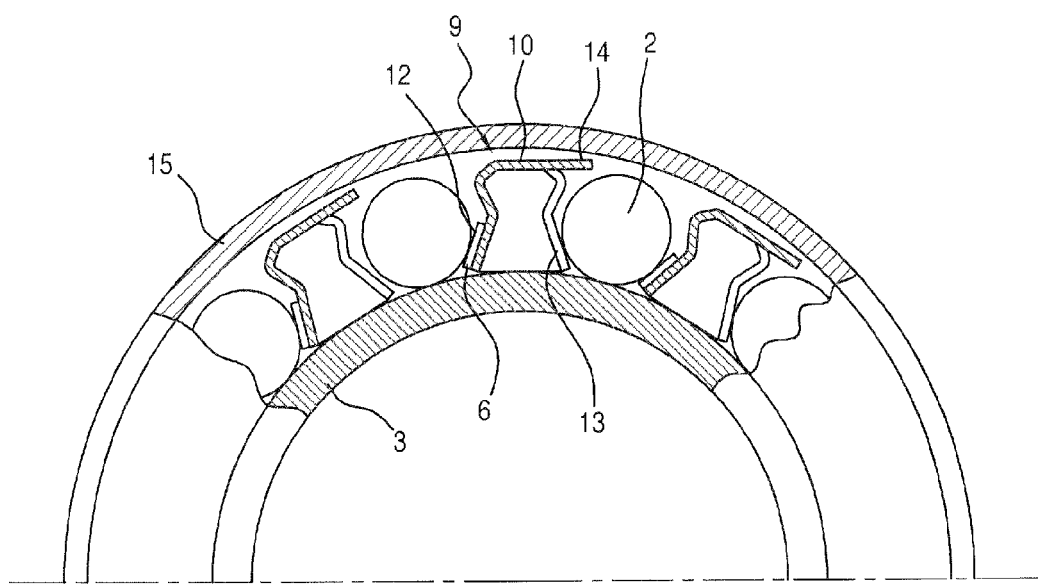
FIG. 18 shows a cross-sectional view of the overrunning clutch.

FIG. 1 illustrates the significant parts of an overrunning clutch 1 with the exception of an outer ring. Clamping bodies 2 which are embodied as rollers or needles are situated in an annular space between an inner raceway 3 and the outer raceway 15. The clamping rollers 2 are guided individually in cut-outs 4 of a cage 5 which is produced from plastic. The inner raceway 3 and/or the outer raceway 15 has, in a manner known per se, clamping ramps (not visible in the illustration) to ensure the desired overrunning function. Spring elements 6, which each project into a cut-out 4, are provided to press the clamping body 2 against the clamping ramps in a defined manner.

Situated axially adjacent to the cage 5 which guides the clamping bodies 2 is a further cage 7 in which cylindrical roller bodies 8 are guided, so that a rolling bearing arrangement is provided between the inner raceway 3 and the outer raceway 15. Like the cage 5 for the clamping rollers 2, the cage 7 for the rolling bodies 8 is also preferably manufactured from plastic, for example from glass-fibre-reinforced plastic. It is also possible to manufacture one single-piece plastic cage which performs the function of both cages 5 and 7.

The individual spring elements 6 are in each case part of a spring carrier 9 which is illustrated in detail in FIGS. 2-6. The spring carrier 9 is manufactured as a single-piece punched and bent part in which the spring element 6 is held on a transverse web 10 which runs in the axial direction of the overrunning clutch 1 and is placed, from the outside radially, on a transverse web of the cage 5 between two adjacent cut-outs 4. The spring element 6 is embodied as a leaf spring which is arranged approximately parallel to the clamping rollers 2 and is connected centrally to the transverse web 10 by means of a transition piece 11 which is angled away from the transverse web 10. Two spring limbs 12 of the spring element 6 project out, in the direction of the end sides of the clamping rollers 2, from the central region, which adjoins the transition piece 11, of the spring element 6. In total, the spring element 6 extends in the axial direction of the overrunning clutch 1 over more than 80% of the length $L_Q$, which is likewise measured in the axial direction, of the transverse web 10.

Two retaining arms 13 are attached, so as to be angled away, to the transverse web 10 at the side which faces away from the transition piece 11 and at the outer sides, that is to say in the vicinity of the end sides of the clamping rollers 2, with said retaining arms 13, when viewed axially, completing a retaining contour which allows the spring carrier 9 to be clipped onto the cage 5. The spring elements 6 are placed onto the cage 5 before the latter is filled with clamping bodies 2. The width $B_Q$ of the transverse webs 10 approximately corresponds to the width of the plastic transverse webs of the cage 5 between adjacent cut-outs 4. The width of the spring limbs 12 is denoted by $B_F$ and approximately corresponds to the width $B_Q$ of the transverse web 10.

When the cage 5, which has been provided with the spring carriers 9 and placed on the inner raceway 3, is filled with clamping bodies 2, a force is exerted on said clamping bodies 2 primarily in the tangential direction by means of the spring limbs 12. As can be seen in particular from FIG. 3, however, the spring limbs 12 do not run exactly in the radial direction of the overrunning clutch 1 as viewed axially. The spring limbs 12 are rather angled approximately 10° to 25° outwards, with the result that the spring element 6 exerts a force component on the clamping roller 2 not only in the tangential direction but also a force component radially outward. When the overrunning clutch 1 is fully assembled, the clamping body 2 is therefore pressed by the spring element 6 into the clamping ramp towards the outer ring in the desired way. In order to prevent the clamping rollers 2 accidentally falling out of the cage 5 during the assembly process, a retaining lug 14 projects centrally out of the transverse web 10 on the side of the retaining arms 13. The length of the retaining lug 14, measured in the peripheral direction of the overrunning clutch 1, that is to say orthogonally with respect to the transverse web 10, is denoted by $L_H$ and approximately corresponds to the width $B_Q$ of the transverse web 10. This dimensioning of the retaining lug 14 both makes it possible for the clamping rollers 2 to be simply inserted into the cut-outs 4 and also provides stable retention of the clamping bodies 2 in the cut-outs 4. The intended clamping action of the overrunning clutch 1 is not influenced by the retaining lugs 14.

FIGS. 7-12 shows a further exemplary embodiment of spring carriers 9' of an overrunning clutch 1 which differs from the previously described exemplary embodiment in that the two retaining lugs 14' proceed from each transverse web 10. With retaining lugs 14', which are slightly longer than those in the exemplary embodiment of FIGS. 1-6, it is also possible here for the clamping roller 2 to be inserted into the cage 5 in a simple, in particular, automated manner.

In the exemplary embodiment according to FIGS. 13-17, spring carrier 9" has the retaining lug 14" which is very wide and extends over more than half of the length $L_Q$ of the transverse web 10 in the axial direction of the overrunning clutch 1, that is to say in the longitudinal direction of said transverse web 10. The retaining lug 14" is therefore designed as a retaining strip which assumes the function of the two retaining lugs 14" of the exemplary embodiment according to FIGS. 7-12. The exemplary embodiment according to FIGS. 13-17 is distinguished in that it provides particularly stable guidance of the clamping bodies 2 in the cut-outs 4 of the cage 5.

LIST OF REFERENCE SYMBOLS

1 Overrunning clutch
2 Clamping body
3 Inner Raceway
4 Cut-out
5 Cage
6 Spring element
7 Cage
8 Rolling body
9, 9', 9" Spring carrier
10 Transverse web
11 Transition piece
12 Spring limb
13 Retaining arm
14, 14', 14" Retaining lug
15 Outer raceway
$B_F$ Width of the spring limb
$B_Q$ Width of the transverse web
$L_H$ Length of the retaining lug
$L_L$ Length of the transverse web

The invention claimed is:
1. An overrunning clutch having an annular space formed between an inner raceway and an outer raceway, a cage positioned in the annular space, the cage having cutouts for housing clamping bodies and transverse webs arranged axially and delimiting adjacent cutouts, a spring carrier attached to each one of the transverse webs of the cage, the improvement wherein each spring carrier comprises:

a transverse web that extends axially on a circumferential surface of the one of the transverse webs of the cage on which the spring carrier is attached;

a spring element extending tangentially from the transverse web of the spring carrier and into one of the cutouts delimited by the one of the transverse webs of the cage on which the spring carrier is attached, the spring element having two spring limbs positioned in the cutout and extending axially in the cutout, the spring limbs angled approximately 10° to 25° outward to exert a force both radially and tangentially on the clamping bodies;

retaining arms extending tangentially from the transverse web of the spring carrier and into the other of the cutouts delimited by the one of the transverse webs of the cage on which the spring carrier is attached; and a retaining lug extending tangentially from the transverse web of the spring carrier and extending circumferentially over the other of the cutouts delimited by the one of transverse webs of the cage on which the spring carrier is attached, such that the clamping bodies are held in the cutouts during assembly.

2. The overrunning clutch according to claim 1, wherein clamping rollers are provided as the clamping bodies.

3. The overrunning clutch according to claim 1, wherein the cage is manufactured from plastic.

4. The overrunning clutch according to claim 1, wherein the spring element is fastened to the transverse web of the spring carrier in a central region of the transverse web of the spring carrier and the two spring limbs project out axially from the central region.

5. The overrunning clutch according to claim 4, wherein the spring limbs are formed from a strip-shaped material portion which is angled so as to be perpendicular to the transverse web of the spring carrier.

6. The overrunning clutch according to claim 4, wherein a width of the spring limb does not deviate from a width of the transverse web of the spring carrier by any more than 50%.

7. The overrunning clutch according to claim 4, wherein the spring limbs of the spring element extend in total over at least 70% of a length of the transverse web of the spring carrier.

8. The overrunning clutch according to claim 1, wherein a length of the retaining lug does not exceed 1.5 times a width of the transverse web of the spring carrier.

* * * * *